(12) United States Patent
Litvin

(10) Patent No.: US 7,693,366 B2
(45) Date of Patent: Apr. 6, 2010

(54) ALIGNED NARROWBAND OPTICAL FILTERS HAVING FLAT PASSBANDS AND COMPRISING OFFSET CASCADED BROADBAND OPTICAL FILTERS

(75) Inventor: Kerry Litvin, Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 12/142,925

(22) Filed: Jun. 20, 2008

(65) Prior Publication Data

US 2009/0316286 A1  Dec. 24, 2009

(51) Int. Cl.
*G02B 6/26* (2006.01)

(52) U.S. Cl. ............................. 385/27; 385/15; 385/24

(58) Field of Classification Search ................ 385/24, 385/27, 15

See application file for complete search history.

(56) References Cited

U.S. PATENT DOCUMENTS

| 6,657,186 B2 * | 12/2003 | Graves ................. 250/227.23 |
| 6,681,065 B1 * | 1/2004 | Minasian et al. ............. 385/27 |
| 6,690,853 B1 * | 2/2004 | Alaimo et al. ................ 385/24 |

* cited by examiner

*Primary Examiner*—Frank G Font
*Assistant Examiner*—Eric Wong
(74) *Attorney, Agent, or Firm*—Larry T. Cullen

(57) ABSTRACT

A cascaded pair of broad bandwidth optical filters provides an overlap in pass-bands that forms a flat, narrow band optical filter. A first band-pass filter is operable to receive the optical signal and to transmit a first portion of the optical signal. The second band-pass filter receives the first portion of the optical signal transmits a second portion of the optical signal. The first band-pass filter has a first corner-pass wavelength of $\lambda_a$, a first corner-stop wavelength of $\lambda_b$, and a first pass-band center wavelength $\lambda_{pb1}$ such that $\lambda_a \leq \lambda_{pb1} \leq \lambda_b$. The second band-pass filter has a second corner-pass wavelength of $\lambda_c$, a second corner-stop wavelength of $\lambda_d$, and a second pass-band center wavelength $\lambda_{pb2}$ such that $\lambda_c \leq \lambda_{pb2} \leq \lambda_d$, wherein $\lambda_a < \lambda_c < \lambda_b < \lambda_d$. As such, the combined pass-band is $\lambda_c \leq \lambda_{pb3} \leq \lambda_b$.

16 Claims, 5 Drawing Sheets

Prior Art

ALIGNED NARROWBAND OPTICAL FILTERS HAVING FLAT PASSBANDS AND COMPRISING OFFSET CASCADED BROADBAND OPTICAL FILTERS

BACKGROUND

In order to increase the amount of data transmitted along a fiber optic transmission line, multiple wavelength transmission systems are used. Dense Wavelength Division Multiplexed (DWDM) optical systems utilize optical filters to combine or separate the optical signals in the network according to their wavelengths.

Optical filters use the principle of interference. Alternating layers of an optical coating are built up upon a substrate, selectively reinforcing certain wavelengths of light and interfering with other wavelengths. By controlling the thickness and number of the layers, the frequency (or wavelength) of the passband of the filter can be tuned and made as wide or as narrow as desired. Unwanted wavelengths are reflected or absorbed, depending on the material used.

DWDM optical systems emerged in force in the mid 1990s out of an industry demand for communication systems with increased transmission capability. Unlike Coarse Wavelength Division Multiplexed (CWDM) technology in which data was transmitted over two to eight channels with channel spacing of 20 nm, DWDM systems evolved to transmit over dozens of closely spaced channels with signals packed at intervals less than 200 GHz.

"Flatness" is a term used to describe a filter profile, in which all wavelengths within the passband of the filter are passed in equal amounts. To minimize distortions in the information being transmitted over a DWDM system, the filter profiles must be very flat. This is particularly true if the system is carrying analog modulated optical signals, as these types of modulation formats are particularly susceptible to the deleterious effects of nonlinear distortions.

To minimize these effects, the operators of DWDM optical networks strive to obtain flat narrowband filters with channel spacings of 100 GHz or smaller. Optical filters are usually employed as part of the multiplexing (MUX) or de-multiplexing (DEMUX) hardware of the optical system. Because of the current limitations of the filter manufacturing processes, DWDM networks with channel spacing below 200 GHz were generally not available for analog applications: excessive amounts of nonlinear distortions are created when signals pass through the narrowband optical channel filters with excessively large pass-band slopes. If realized, flat narrowband filters with channel spacings of 100 GHz or smaller will open up DWDM networks utilizing wavelengths in the 1550 nm range, the 1450 nm range, and the low 1310 nm range to analog optical communication applications.

FIG. 1. illustrates a simplified optical DWDM optical network 100 that includes: a plurality of data inputs 102, 104, 106, and 108; transmitters 110, 112, 114, and 116; an optical multiplexer 118; an optical de-multiplexer 120; fiber optic transmission lines 130, 132, 134, 138, 140, 142, 144, and 146; optical signal receivers 122, 124, 126, and 128; and data signal outputs 148, 150, 152, and 154.

In operation, transmitters 110, 112, 114, and 116 receive data from inputs 102, 104, 106, and 108 and transmit signals with respective characteristic wavelengths $\lambda_1$-$\lambda_4$ along respective fiber optic transmission lines 130, 132, 134, and 136 to multiplexer 118. Multiplexer 118 combines the optical signals and forwards the combined multiwavelength signal to fiber optic transmission line 138. The transmitted signal arrives at de-multiplexer 120 where it is split into a plurality of signals $\lambda_1$-$\lambda_4$ along individual fiber optic transmission lines 140, 142, 144, and 146. De-multiplexer 120 acts as a gate for incoming signals, re-directing them to specific fiber optic transmission lines according to their individual wavelengths. Receivers 122, 124, 126, and 128 collect signals $\lambda_1$-$\lambda_4$ from fiber optic transmission lines 140, 142, 144, and 146, respectively, and transmit the signals as data output 148, 150, 152, and 154.

To prevent the generation of unwanted second and third order distortions (CSO and CTB) in DWDM systems transmitting analog modulated signals requires that the optical filters within the network have both a narrow pass-band and also have a level insertion loss across this entire pass-band, i.e., are filters that are both flat and narrowband. Transmission of analog DWDM signals enable multiple separate transmission channels, whereas flat pass-bands minimize unwanted CSO and CTB distortions that are generated by the signal passing through an optical filter.

Conventionally, DWDM optical communication systems require optical filters with pass-bands ranging from 200 GHz to as small as 25 GHz. Due to technical and physical limitations during the manufacturing process, the production of such filters with very shallow pass-band slopes is quite difficult. In the 1550 nm range (C or L bands) the excessive slopes that occur in the filter pass-bands are compensated for by using laser transmitters that have very small chirp values (below 90 MHz/mA). The low chirp 1550 lasers are more expensive than lasers with mediocre chirp values but they nevertheless permit the use of optical channel filters with narrow pass-bands and larger slope magnitudes. Furthermore, in the 1310 nm range, DWDM is not easily realized because of the unavailability of low chirp lasers and also the inability to manufacture narrowband optical channel filters with flat pass-bands to compensate for the large laser chirp values. Although the lasers at 1310 nm are typically less expensive than those at 1550 nm the chirp values at 1310 nm are usually much higher as well (greater than 120 MHz/mA).

FIG. 2, illustrates a pass-band 202 from a flat band-pass optical filter. The band-pass optical filter prevents transmission of all wavelengths from 0 to less than $\lambda_a$, prevents transmission of all wavelengths greater than $\lambda_b$, and transmits all wavelengths between $\lambda_a$ and $\lambda_b$. Since all wavelengths between $\lambda_a$ and $\lambda_b$ within pass-band 202 are transmitted with equal strength, the corresponding optical filter would be considered a 'flat' pass-band filter. In other words, ideally there is no slope, tilt, or ripple in the pass-band. Conventionally, due to manufacturing technology limitations decreasing the spectral width of the pass-band of an optical band-pass filter in order to enable multiple separate transmission frequencies, requires a sacrifice of the filter's "flatness." When an optical filter has excessive slope, tilt or ripple, in its pass-band, CSO and CTB will be generated and corrupt the quality of the information being carried by the signal.

FIG. 3 illustrates a typical narrow pass-band 302 response of a narrow band filter. The band-pass optical filter prevents transmission of all wavelengths from 0 to less than $\lambda_x$, prevents transmission of all wavelengths greater than $\lambda_z$, and transmits all wavelengths between $\lambda_x$ and $\lambda_z$. However, the filter having pass-band 302 does not transmit all wavelengths between $\lambda_x$ and $\lambda_z$ (including $\lambda_y$) equally. Consequently, the effects of CSO and CTB distort the signal. The result is the overall degradation of the signal and loss of information.

It is desirable to have a flat narrowband optical filter. Such devices would allow DWDM with analog modulated signal transmissions.

BRIEF SUMMARY

Although it is exceedingly difficult to manufacture narrow band optical channel filter with a flat response, it is quite possible to produce broadband optical filters, for example 16 nm wide, with very flat responses. Broadband optical filters routinely have pass-bands with slope magnitudes well below 0.1 dB/nm. The present invention makes use of this by cascading broad bandwidth filters in pairs such that they are offset in their respective center wavelengths. The overlap in pass-bands forms a flat, narrow band optical filter.

In accordance with one aspect of the present invention a device may be used with an optical signal. The device comprises a first band-pass filter and a second band-pass filter. The first band-pass filter is operable to receive the optical signal and to transmit a first portion of the optical signal. The second band-pass filter is operable to receive the first portion of the optical signal and to transmit a second portion of the optical signal. The first band-pass filter has a first corner-pass wavelength of $\lambda_a$, a first corner-stop wavelength of $\lambda_b$, and a first pass-band center wavelength $\lambda_{pb1}$ such that $\lambda_a \leq \lambda_{pb1} \leq \lambda_b$. The second band-pass filter has a second corner-pass wavelength of $\lambda_c$, a second corner-stop wavelength of $\lambda_d$, and a second pass-band center wavelength $\lambda_{pb2}$ such that $\lambda_c \leq \lambda_{pb2} \leq \lambda_d$, wherein $\lambda_a < \lambda_c < \lambda_b < \lambda_d$.

In accordance with one aspect of the present invention a system comprises a laser, a first input optical fiber, a first band-pass filter, a second band-pass filter, a second input optical fiber, a third band-pass filter, and a fourth band-pass filter. The laser is operable to output an optical signal. The first input optical fiber is operable to transmit the optical signal. The first band-pass filter is operable to receive the optical signal from the first input optical fiber and to transmit a first portion of the optical signal. The second band-pass filter is operable to receive the first portion of the optical signal and to transmit a second portion of the optical signal. The second input optical fiber is operable to transmit the optical signal. The third band-pass filter is operable to receive the optical signal from the second input optical fiber and to transmit a third portion of the optical signal. The fourth band-pass filter is operable to receive the third portion of the optical signal and to transmit a fourth portion of the optical signal. The first band-pass filter has a first corner-pass wavelength of $\lambda_a$, a first corner-stop wavelength of $\lambda_b$, and a first pass-band center wavelength $\lambda_{pb1}$ such that $\lambda_a \leq \lambda_{pb1} \leq \lambda_b$. The second band-pass filter has a second corner-pass wavelength of $\lambda_c$, a second corner-stop wavelength of $\lambda_d$, and a second pass-band center wavelength $\lambda_{pb2}$ such that $\lambda_c \leq \lambda_{pb2} \leq \lambda_d$, wherein $\lambda_a < \lambda_c < \lambda_b < \lambda_d$. The third band-pass filter has a third corner-pass wavelength of $\lambda_e$, a third corner-stop wavelength of $\lambda_f$, and a third pass-band center wavelength $\lambda_{pb3}$ such that $\lambda_e \leq \lambda_{pb3} \leq \lambda_f$. The fourth band-pass filter has a fourth corner-pass wavelength of $\lambda_g$, a fourth corner-stop wavelength of $\lambda_h$, and a fourth pass-band center wavelength $\lambda_{pb4}$ such that $\lambda_g \leq \lambda_{pb4} \leq \lambda_h$, wherein $\lambda_e < \lambda_g < \lambda_f < \lambda_h$.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
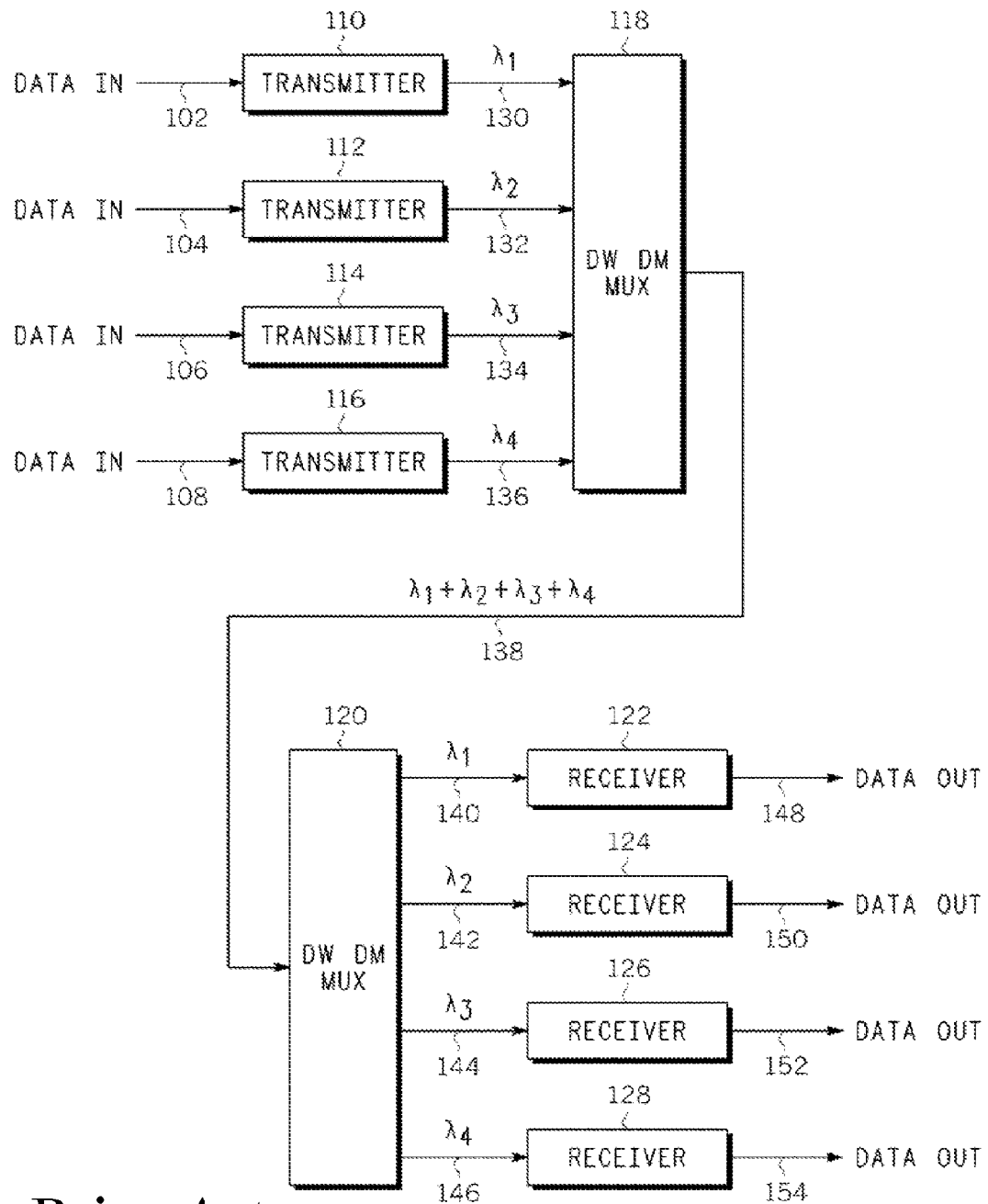
FIG. 1 illustrates a simplified DWDM optical network.
Figure 2:
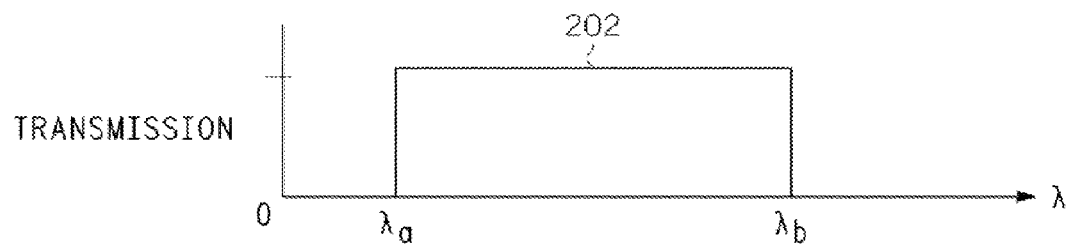
FIG. 2 illustrates a broad pass-band corresponding to a flat pass-band optical filter.
Figure 3:
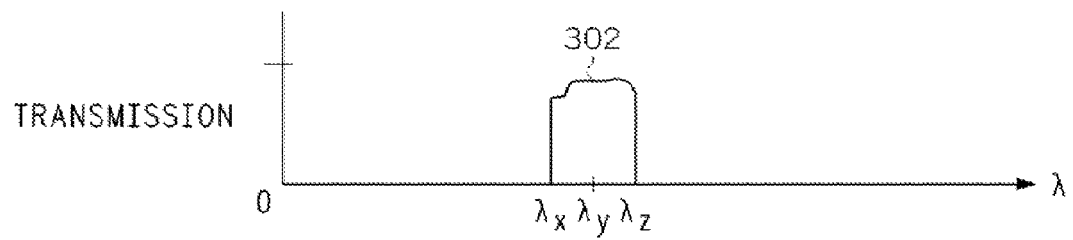
FIG. 3 illustrates a narrow pass-band response corresponding to a conventional narrow band optical filter.

In accordance with one aspect of the present invention, a narrowband filter has a flat filter profile. This flat filter profile minimizes CSO and CTB distortions that are generated by a signal passing through the narrowband filter. Acceptable flatness will now be described in further detail below.

The maximum acceptable slope or "flatness" of a filter can be determined from the system requirements. Using the system CSO value as a requirement leads to the following two equivalent relationships:

$$\left|\frac{dA}{d\lambda}\right|_{[dB/nm]} \leq \frac{10}{\ln(10)} \frac{1}{\sqrt{N_{CSO}}} \frac{c}{m\alpha(I-I_{th})} \frac{1}{\lambda_0^2} \left( 10^{-\left(\frac{CSO_{tot\_deg}^{dB\ elec}}{20}\right)} - 10^{-\left(\frac{CSO_{nat}^{dB\ elec}}{20}\right)} \right) \quad (1a)$$

Or alternatively $$\left|\frac{dA}{d\lambda}\right|_{[dB/nm]} \leq \frac{10}{\ln(10)} \frac{1}{\sqrt{N_{CSO}}} \frac{c\gamma}{m\alpha P_0} \frac{1}{\lambda_0^2} \left( 10^{-\left(\frac{CSO_{tot\_deg}^{dB\ elec}}{20}\right)} - 10^{-\left(\frac{CSO_{nat}^{dB\ elec}}{20}\right)} \right) \quad (1b)$$

Where:

$$\left|\frac{dA}{d\lambda}\right|_{[dB/nm]}$$

is the magnitude of the filter pass-band slope;

$\lambda_0$ Optical transmitter's central wavelength;

$CSO_{nat}^{dB\ elec}$ is the transmitter's native CSO value measured in dBc-electrical units;

$CSO_{tot\_deg}^{dB\ elec}$ is the minimum allowable CSO value of the signal after passing through the optical filters. This value is determined by the specified system requirements;

$N_{CSO}$ is the number of CSO beats that comprise the distortion power at the CSO frequency under consideration (typically the number of beats at 54 MHz is used);

c is the speed of light in vacuum;

m is the optical modulation index $0<m\leq 1$;

α is the laser chirp, or FM efficiency, (typically quoted in MHz/mA);

γ is the laser slope efficiency y (usually quoted in mW/mA);

$I, I_{th}$ the bias current and threshold current respectively of the laser transmitter; and $P_0$ is the optical output power of the laser transmitter.

In order that the $CSO_{tot\_deg}^{dB\ elec}$ specification not be violated, the allowable slopes in the filter pass-bands must conform to the restrictions imposed by (1a) or (1b). Notice that as the laser's chirp, α, is increased the restriction on the filter slope becomes tighter. That is, a system utilizing transmitters with very high chirp values must compensate for this flaw by also utilizing filters with very small slopes in order to ensure that the CSO levels that are generated when the highly chirped signals pass through the filters are not excessive.

Once acceptable flatness of a filter profile for two separate broadband filters is established, then a flat, narrowband filter may be created by offsetting the two broadband filters.

The wavelength (or frequency) offset of the two cascaded broadband filters is determined by the bandwidths of the filters $BW_w$ and the desired bandwidth of the narrow band filter $BW_n$, and c is the speed of light in vacuum.

$$BW_n = BW_w - c(1/\lambda_0 - 1/\lambda_0')$$

Where $\lambda_0$ and $\lambda_0'$ are the respective center optical wavelengths of the two cascaded broadband optical filters. It is assumed here that the broadband optical filters each have the same bandwidth $BW_w$.

Figure 4A:
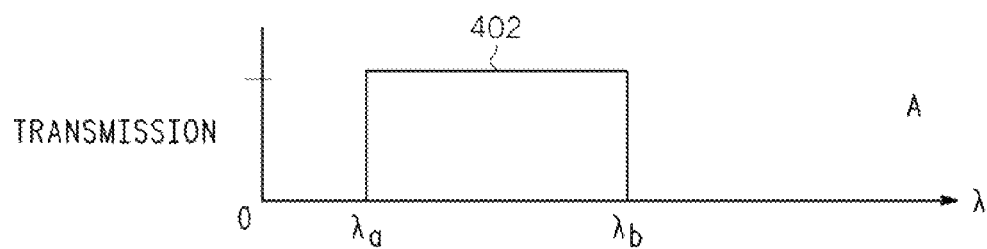
FIG. 4A illustrates a flat, broad pass-band corresponding to an optical filter.
Figure 4B:
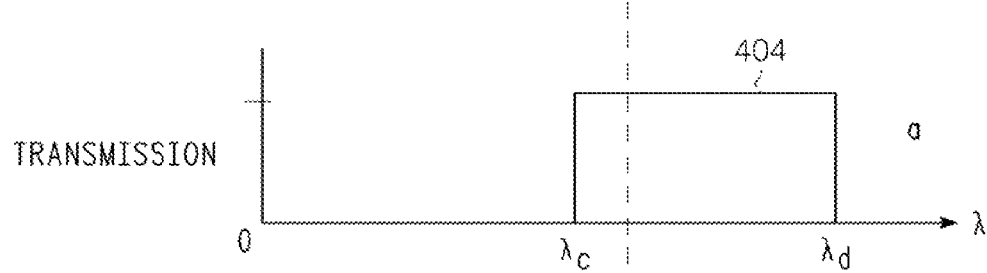
FIG. 4B illustrates a flat, broad pass-band corresponding to another optical filter.
Figure 4C:
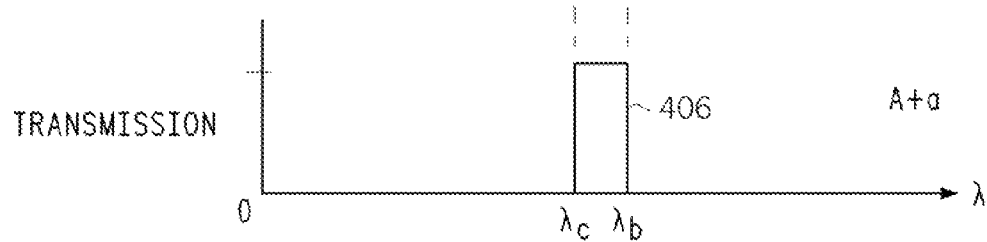
FIG. 4C illustrates a flat, narrow pass-band resulting from a cascaded pair the optical filters of FIGS. 4A and 4B.

An aspect of the present invention is shown in FIG. 4A-C.

FIG. 4A illustrates a flat broad pass-band 402 of a first optical filter A. The band-pass optical filter A prevents transmission of all wavelengths from 0 to less than $\lambda_a$, prevents transmission of all wavelengths greater than $\lambda_b$, and transmits all wavelengths between $\lambda_a$ and $\lambda_b$ in equal amounts. The pass-band of optical filter A is at the very least, acceptable as defined by equations (1a) and (1b) discussed above, has a slope below 0.1 dB/nm, or ideally has no slope, tilt, or ripple.

FIG. 4B illustrates a flat, broad pass-band 404 of a second optical filter a. The band-pass optical filter a prevents transmission of all wavelengths from 0 to less than $\lambda_c$, prevents transmission of all wavelengths greater than $\lambda_d$, and transmits all wavelengths between $\lambda_c$ and $\lambda_d$ in equal amounts. Similar to optical filter A, discussed above, the pass-band of optical filter a is at the very least, acceptable as defined by equations (1a) and (1b) discussed above, has a slope below 0.1 dB/nm, or ideally has no slope, tilt, or ripple.

Optical filter A transmits a first portion of an optical signal within a range of signal wavelengths $\lambda_a \leq \lambda \leq \lambda_b$, whereas optical filter a transmits a second portion of the optical signal within a range of signal wavelengths $\lambda_c \leq \lambda \leq \lambda_d$, wherein $\lambda_a < \lambda_c < \lambda_b < \lambda_d$. As illustrated in FIG. 4C, by cascading optical filters A and a such that an optical signal will pass through both optical filters, the only portion of the signal that will ultimately be transmitted will be the portion of the signal having the narrow pass-band region 406 given by $\lambda_c \leq \lambda \leq \lambda_b$. In this region, all wavelengths $\lambda_c \leq \lambda \leq \lambda_b$ are equally transmitted. Accordingly, transmitting a signal through a pair of cascaded broadband, flat optical filters that have an offset, partially overlapping band-pass, will produce a flat, narrowband signal.

It is possible that the physical disposition of optical filter A with reference to optical filter a as discussed above may create an optical cavity, which may distort passing signal. Specifically, if the distance between optical filter A and optical filter a is $(n/4)\lambda$, where n is an integer, then the "cavity" between filter A and filter a may induce resonance for a signal at wavelength λ. As such, in an exemplary embodiment, an optical isolator may be disposed between optical filter A and optical filter a to prevent such unwanted issues. Any known optical isolator may be used, a non-limiting example of which includes a doped ferrite material.

Figure 5:
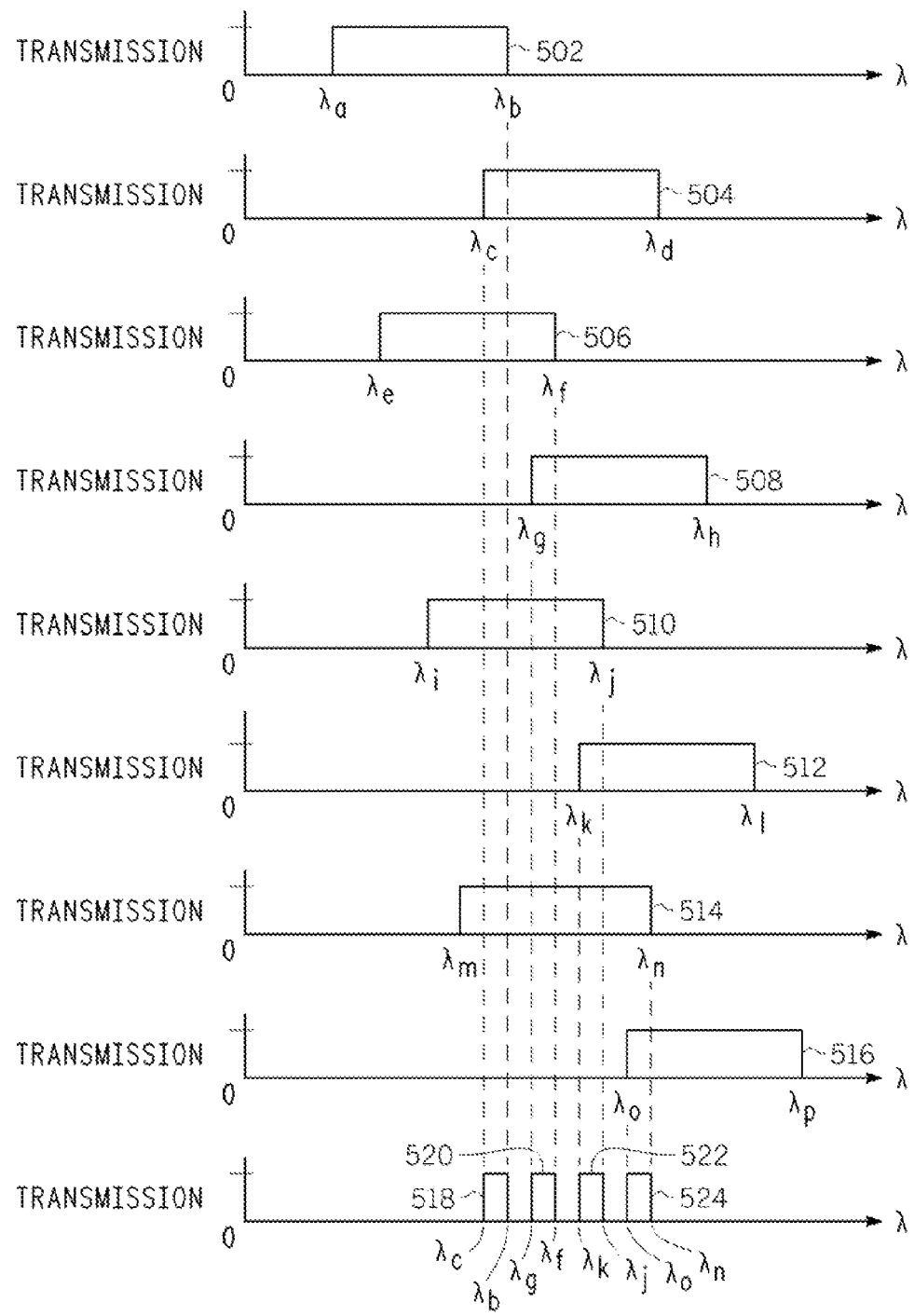
FIG. 5 illustrates the use of cascaded pairs of flat, broad pass-band optical filters to produce four non-overlapping, flat, narrowband optical filters.

FIG. 5 depicts the pass-bands corresponding to eight flat, broadband optical filters staggered in such a fashion so as to produce four non-overlapping, flat, narrowband optical filters. In the figure, flat, broadband optical filters A and a, B and b, C and c, and D and d represent four pairs of cascaded optical filters used to produce four flat, narrow pass-bands 518, 520, 522, and 524 respectively.

A flat broad pass-band 502 of a first optical filter A prevents transmission of all wavelengths from 0 to less than $\lambda_a$, prevents transmission of all wavelengths greater than $\lambda_b$, and transmits all wavelengths between $\lambda_a$ and $\lambda_b$ in equal amounts. A flat, broad pass-band 504 of a second optical filter a prevents transmission of all wavelengths from 0 to less than $\lambda_c$, prevents transmission of all wavelengths greater than $\lambda_d$, and transmits all wavelengths between $\lambda_c$ and $\lambda_d$ in equal amounts. Optical filter A transmits a first portion of an optical signal within a range of signal wavelengths $\lambda_a \leq \lambda \leq \lambda_b$, whereas optical filter a transmits a second portion of the optical signal within a range of signal wavelengths $\lambda_c \leq \lambda \leq \lambda_d$, wherein $\lambda_a < \lambda_c < \lambda_b < \lambda_d$. By cascading optical filters A and a such that an optical signal will pass through both optical filters, the only portion of the signal that will ultimately be transmitted will be the portion of the signal having the narrow pass-band region 518 given by $\lambda_c \leq \lambda \leq \lambda_b$. In this region, all wavelengths $\lambda_c \leq \lambda \leq \lambda_b$ are equally transmitted. Accordingly, transmitting a signal through a pair of cascaded broadband, flat optical filters that have an offset, partially overlapping band-pass, will produce a flat, narrowband signal.

A flat broad pass-band 506 of a first optical filter B prevents transmission of all wavelengths from 0 to less than $\lambda_e$, prevents transmission of all wavelengths greater than $\lambda_f$, and transmits all wavelengths between $\lambda_e$ and $\lambda_f$ in equal amounts. A flat, broad pass-band 508 of a second optical filter b prevents transmission of all wavelengths from 0 to less than $\lambda_g$, prevents transmission of all wavelengths greater than $\lambda_h$, and transmits all wavelengths between $\lambda_g$ and $\lambda_h$ in equal amounts. Optical filter B transmits a first portion of an optical signal within a range of signal wavelengths $\lambda_e \leq \lambda \leq \lambda_f$, whereas optical filter b transmits a second portion of the optical signal within a range of signal wavelengths $\lambda_g \leq \lambda \leq \lambda_h$, wherein $\lambda_e < \lambda_g < \lambda_f < \lambda_h$. By cascading optical filters B and b such that an optical signal will pass through both optical filters, the only portion of the signal that will ultimately be transmitted will be the portion of the signal having the narrow pass-band region 520 given by $\lambda_g \leq \lambda \leq \lambda_f$. In this region, all wavelengths $\lambda_g \leq \lambda \leq \lambda_f$ are equally transmitted. Accordingly, transmitting a signal through a pair of cascaded broadband, flat optical filters that have an offset, partially overlapping band-pass, will produce a flat, narrowband signal.

A flat broad pass-band 510 of a first optical filter C prevents transmission of all wavelengths from 0 to less than $\lambda_i$, prevents transmission of all wavelengths greater than $\lambda_j$, and transmits all wavelengths between $\lambda_i$ and $\lambda_j$ in equal amounts. A flat, broad pass-band 512 of a second optical filter c prevents transmission of all wavelengths from 0 to less than $\lambda_k$, prevents transmission of all wavelengths greater than $\lambda_l$, and transmits all wavelengths between $\lambda_k$ and $\lambda_l$ in equal amounts. Optical filter C transmits a first portion of an optical signal within a range of signal wavelengths $\lambda_i \leq \lambda \leq \lambda_j$, whereas optical filter c transmits a second portion of the optical signal within a range of signal wavelengths $\lambda_k \leq \lambda \leq \lambda_l$, wherein $\lambda_i < \lambda_k < \lambda_j < \lambda_l$. By cascading optical filters C and c such that an optical signal will pass through both optical filters, the only portion of the signal that will ultimately be transmitted will be the portion of the signal having the narrow pass-band region 522 given by $\lambda_k \leq \lambda \leq \lambda_j$. In this region, all wavelengths $\lambda_k \leq \lambda \leq \lambda_j$ are equally transmitted. Accordingly, transmitting a signal through a pair of cascaded broadband, flat optical filters that have an offset, partially overlapping band-pass, will produce a flat, narrowband signal.

A flat broad pass-band 514 of a first optical filter D prevents transmission of all wavelengths from 0 to less than $\lambda_m$, prevents transmission of all wavelengths greater than $\lambda_n$, and transmits all wavelengths between $\lambda_m$ and $\lambda_n$ in equal amounts. A flat, broad pass-band 516 of a second optical filter d prevents transmission of all wavelengths from 0 to less than $\lambda_o$, prevents transmission of all wavelengths greater than $\lambda_p$, and transmits all wavelengths between $\lambda_o$ and $\lambda_p$ in equal amounts. Optical filter D transmits a first portion of an optical signal within a range of signal wavelengths $\lambda_m \leq \lambda \leq \lambda_n$, whereas optical filter d transmits a second portion of the optical signal within a range of signal wavelengths $\lambda_o \leq \lambda \leq \lambda_p$, wherein $\lambda_m < \lambda_o < \lambda_n < \lambda_p$. By cascading optical filters D and d such that an optical signal will pass through both optical filters, the only portion of the signal that will ultimately be transmitted will be the portion of the signal having the narrow pass-band region 524 given by $\lambda_o \leq \lambda \leq \lambda_n$. In this region, all wavelengths $\lambda_o \leq \lambda \leq \lambda_n$ are equally transmitted. Accordingly, transmitting a signal through a pair of cascaded broadband, flat optical filters that have an offset, partially overlapping band-pass, will produce a flat, narrowband signal.

A single signal fiber transmitting four wavelengths may be split by known methods into four fibers, wherein each fiber includes one of cascaded pairs of broadband, flat optical filters A and a, B and b, C and c and D and d discussed above. A flat broadband signal would then be transmitted through four each fiber, wherein the transmitted narrowband signals are separated by bandgap separations, $\lambda_g - \lambda_b$, $\lambda_k - \lambda_f$, and $\lambda_o - \lambda_j$.

Figure 6:
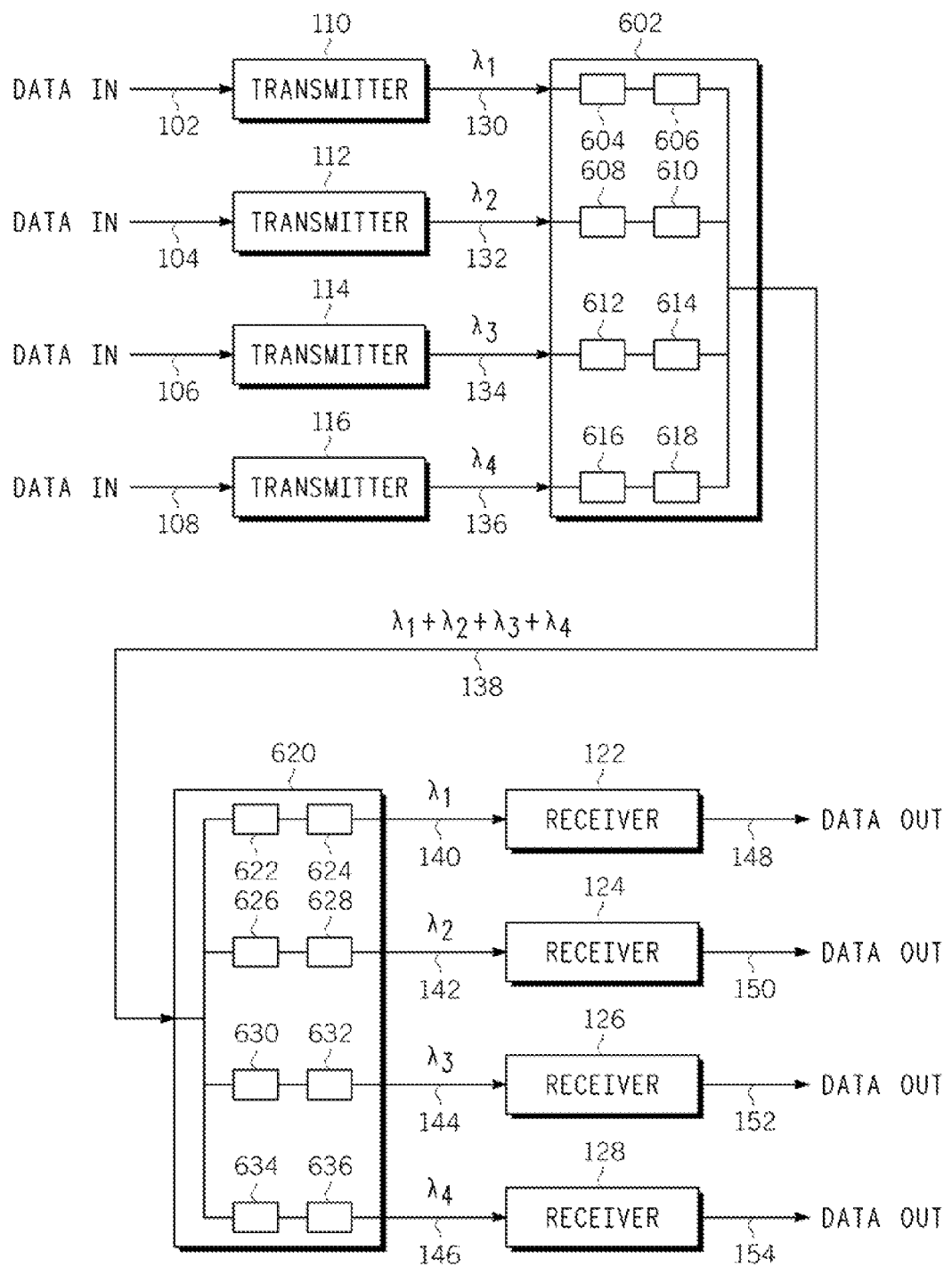
FIG. 6 illustrates a DWDM optical network in accordance with the present invention.

An arrangement of eight flat, band-pass optical filters shown in FIG. 5 can be used as part of a DWDM optical network. FIG. 6 illustrates a DWDM optical network 600 in accordance with an exemplary embodiment of the present invention. DWDM optical network 600 of FIG. 6 differs from DWDM optical network 100 of FIG. 1 in that multiplexer 118 of DWDM network 100 is replaced with multiplexer 602, and de-multiplexer 120 of DWDM optical network 100 is replaced with de-multiplexer 620.

Multiplexer 602 includes: a flat, broadband optical filter 604 and a flat, broadband optical filter 606 arranged as a cascaded pair; a flat, broadband optical filter 608 and a flat, broadband optical filter 610 arranged as a cascaded pair; a flat, broadband optical filter 612 and a flat, broadband optical filter 614 arranged as a cascaded pair; and a flat, broadband optical filter 616 and a flat, broadband optical filter 618 arranged as a cascaded pair. Signals from each of flat, broadband optical filter 606, flat, broadband optical filter 610, flat, broadband optical filter 614, and flat, broadband optical filter 618 may be combined into signal 138 by any known method or structure, non-limiting examples of which include full mirrors, partial mirrors, dichroic mirrors and prisms.

De-multiplexer 620 includes: a flat, broadband optical filter 622 and a flat, broadband optical filter 624 arranged as a cascaded pair; a flat, broadband optical filter 626 and a flat, broadband optical filter 628 arranged as a cascaded pair; a flat, broadband optical filter 630 and a flat, broadband optical filter 632 arranged as a cascaded pair; and a flat, broadband optical filter 634 and a flat, broadband optical filter 636 arranged as a cascaded pair. Signal 138 may be directed into each of flat, broadband optical filter 622, flat, broadband optical filter 626, flat, broadband optical filter 630, and flat, broadband optical filter 634 by any known method or structure, non-limiting examples of which include full mirrors, partial mirrors, dichroic mirrors and prisms.

Flat, broadband optical filter 604 has a pass-band similar to pass-band 502 illustrated in FIG. 5. Flat, broadband optical filter 606 has a pass-band similar to pass-band 504 illustrated in FIG. 5. Accordingly, the pass-band from the cascaded pair of flat, broadband optical filter 604 and flat, broadband optical filter 606 will correspond to narrow pass-band region 518 of FIG. 5.

Flat, broadband optical filter 608 has a pass-band similar to pass-band 506 illustrated in FIG. 5. Flat, broadband optical filter 610 has a pass-band similar to pass-band 508 illustrated in FIG. 5. Accordingly, the pass-band from the cascaded pair of flat, broadband optical filter 608 and flat, broadband optical filter 610 will correspond to narrow pass-band region 520 of FIG. 5.

Flat, broadband optical filter 612 has a pass-band similar to pass-band 510 illustrated in FIG. 5. Flat, broadband optical filter 614 has a pass-band similar to pass-band 512 illustrated in FIG. 5. Accordingly, the pass-band from the cascaded pair of flat, broadband optical filter 612 and flat, broadband optical filter 614 will correspond to narrow pass-band region 522 of FIG. 5.

Flat, broadband optical filter 616 has a pass-band similar to pass-band 514 illustrated in FIG. 5. Flat, broadband optical filter 618 has a pass-band similar to pass-band 516 illustrated in FIG. 5. Accordingly, the pass-band from the cascaded pair of flat, broadband optical filter 616 and flat, broadband optical filter 618 will correspond to narrow pass-band region 524 of FIG. 5.

As a result of the cascaded pair of flat, broadband optical filters within de-multiplexer 620, each signals 140, 142, 144 and 146 has a narrow band of frequencies that are all transmitted in a generally equal amount. Accordingly, the effects of passband slope (or passband tilt) generated CSO and CTB are minimized.

The four pairs of cascaded flat, broadband optical filters within multiplexer 602 and de-multiplexer 620 of FIG. 6 illustrate an exemplary embodiment. Any number of pairs of cascaded flat, broadband optical filters in accordance with the present invention may be used to provide a corresponding number of separated, distinct, flat, narrow passbands.

The cascaded pair of broadband optical filters in accordance with the present invention provide a flat, narrow band of optical signals that are much less susceptible to the deleterious effects of nonlinear distortions generated by the filter passband slopes and thus enable transmission of analog modulated DWDM optical signals.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device comprising:
a first band-pass filter operable to receive a first optical signal from a laser and to transmit a first portion of the first optical signal; and
a second band-pass filter operable to receive the first portion of the first optical signal and to transmit a second portion of the first optical signal,
wherein said first band-pass filter has a first corner-pass wavelength of $\lambda_a$, a first corner-stop wavelength of $\lambda_b$, and a first pass-band center wavelength $\lambda_{pb1}$ such that $\lambda_a \leq \lambda_{pb1} \leq \lambda_b$,
wherein said second band-pass filter has a second corner-pass wavelength of $\lambda_c$, a second corner-stop wavelength of $\lambda_d$, and a second pass-band center wavelength $\lambda_{pb2}$ such that $\lambda_c \leq \lambda_{pb2} \leq \lambda_d$, and
wherein $\lambda_a < \lambda_c < \lambda_b < \lambda_d$,
wherein $$\left| \frac{dA}{d\lambda} \right|_{dB/nm}$$

is the magnitude of each of the filter pass-band slopes of said first and second band-pass filters,
wherein $\lambda_0$ is a central wavelength of said laser,
wherein $\mathrm{CSO}_{nat}^{dB\_elec}$ is a native second order distortion value of said laser measured in dBc-electrical units,
wherein $\mathrm{CSO}_{tot\_deg}^{dB\_elec}$ is a minimum allowable second order distortion value of a signal after having passed through said first and second band-pass filters,
wherein $N_{CSO}$ is a number of second order distortion beats that comprise a distortion power at a second order distortion frequency under consideration,
wherein c is the speed of light in a vacuum,
wherein m is an optical modulation index $0 < m \leq 1$,
wherein $\alpha$ is a laser chirp of said laser,
wherein y is a laser slope efficiency y of said laser,
wherein I is a bias current of said laser,
wherein $I_{th}$ is a threshold current of said laser,
wherein $P_O$ is an optical output power of said laser, and
wherein the magnitude of each filter pass-band slope of each said first and second band-pass filters satisfies at least one of $$\left| \frac{dA}{d\lambda} \right|_{dB/nm} \leq \frac{10}{\ln(10)} \frac{1}{\sqrt{N_{CSO}}} \frac{c}{m\alpha(I-I_{th})} \frac{1}{\lambda_0^2} \left[ 10^{-\left[\frac{CSO_{tot\_deg}^{dB\_elec}}{20}\right]} - 10^{-\left[\frac{CSO_{nat}^{dB\_elec}}{20}\right]} \right]$$

and $$\left| \frac{dA}{d\lambda} \right|_{dB/nm} \leq \frac{10}{\ln(10)} \frac{1}{\sqrt{N_{CSO}}} \frac{c\gamma}{m\alpha P_O} \frac{1}{\lambda_0^2} \left[ 10^{-\left[\frac{CSO_{tot\_deg}^{dB\_elec}}{20}\right]} - 10^{-\left[\frac{CSO_{nat}^{dB\_elec}}{20}\right]} \right].$$

2. The device of claim 1, wherein $|\lambda_b - \lambda_a| = |\lambda_d - \lambda_c|$.

3. The device of claim 1, further comprising:
a third band-pass filter operable to receive a second optical signal and to transmit a first portion of the second optical signal; and
a fourth band-pass filter operable to receive the first portion of the second optical signal and to transmit a second portion of the second optical signal,
wherein said third band-pass filter has a third corner-pass wavelength of $\lambda_e$, a third corner-stop wavelength of $\lambda_f$, and a third pass-band center wavelength $\lambda_{pb3}$ such that $\lambda_e \leq \lambda_{pb3} \leq \lambda_f$,
wherein said fourth band-pass filter has a fourth corner-pass wavelength of $\lambda_g$, a fourth corner-stop wavelength of $\lambda_h$, and a fourth pass-band wavelengths $\lambda_{pb4}$ such that $\lambda_g \leq \lambda_{pb4} \leq \lambda_h$, and
wherein $\lambda_e < \lambda_g < \lambda_f < \lambda_h$.

4. The device of claim 3, further comprising:
a signal controlling device,
wherein the first optical signal is the second optical signal, and
wherein said signal controlling device is operable to provide the first optical signal to at least one of said first band-pass filter and said third band-pass filter.

5. The device of claim 4, wherein said signal controlling device comprises a demultiplexer.

6. The device of claim 3, further comprising a signal controlling device operable to combine the second portion of the first optical signal and the second portion of the second optical signal.

7. The device of claim 6, wherein said signal controlling device comprises a multiplexer.

8. The device of claim 3, wherein
$|\lambda_b - \lambda_a| = |\lambda_d - \lambda_c|$, and
wherein $|\lambda_f - \lambda_e| = |\lambda_g - \lambda_h|$.

9. A method used in an optical network comprising:
receiving a first optical signal;
filtering the received first optical signal via a first band-pass filter having a first corner-pass wavelength of $\lambda_a$, a first corner-stop wavelength of $\lambda_b$, and a first pass-band center wavelength $\lambda_{pb1}$ such that $\lambda_a \leq \lambda_{pb1} \leq \lambda_b$;
transmitting the filtered received first optical signal as a first portion of the received first optical signal;
filtering the first portion of the received first optical signal via a second band-pass filter having a second corner-pass wavelength of $\lambda_c$, a second corner-stop wavelength of $\lambda_c$, and a second pass-band center wavelength $\lambda_{pb2}$ such that $\lambda_c \leq \lambda_{pb2} \leq \lambda_d$; and
transmitting the filtered first portion of the received optical signal as a second portion of the received first optical signal,
wherein $\lambda_a < \lambda_c < \lambda_b < \lambda_d$,
wherein $$\left| \frac{dA}{d\lambda} \right|_{dB/nm}$$

is a magnitude of the filter pass-band slopes of said first and second band-pass filters,
wherein $\lambda_0$ is a central wavelength of said laser,
wherein $\mathrm{CSO}_{nat}^{dB\_elec}$ is a native second order distortion value of said laser measured in dBc-electrical units,
wherein $\mathrm{CSO}_{tot\_deg}^{dB\_elec}$ is a minimum allowable second order distortion value of a signal after having passed through said first and second band-pass filters,
wherein $N_{CSO}$ is a number of second order distortion beats that comprise a distortion power at a second order distortion frequency under consideration,
wherein c is the speed of light in a vacuum,
wherein m is an optical modulation index $0 < m \leq 1$, wherein α is a laser chirp of said laser,
wherein y is a laser slope efficiency y of said laser,
wherein I is a bias current of said laser,
wherein $I_{th}$ is a threshold current of said laser,
wherein $P_O$ is an optical output power of said laser, and
wherein the magnitude of each filter pass-band slope of each said first and second band-pass filters satisfies at least one of $$\left|\frac{dA}{d\lambda}\right|_{dB/nm} \leq \frac{10}{\ln(10)}\frac{1}{\sqrt{N_{CSO}}}\frac{c}{m\alpha(I-I_{th})}\frac{1}{\lambda_0^2}\left[10^{-\left[\frac{CSO_{tot\_deg}^{dB\_elec}}{20}\right]} - 10^{-\left[\frac{CSO_{nat}^{dB\_elec}}{20}\right]}\right]$$

and $$\left|\frac{dA}{d\lambda}\right|_{dB/nm} \leq \frac{10}{\ln(10)}\frac{1}{\sqrt{N_{CSO}}}\frac{c\gamma}{m\alpha P_O}\frac{1}{\lambda_0^2}\left[10^{-\left[\frac{CSO_{tot\_deg}^{dB\_elec}}{20}\right]} - 10^{-\left[\frac{CSO_{nat}^{dB\_elec}}{20}\right]}\right].$$

10. The method of claim 9, wherein $|\lambda_b-\lambda_a|=|\lambda_d-\lambda_c|$.

11. The method of claim 9, further comprising:
receiving a second optical signal;
filtering the received second optical signal via a third band-pass filter having a third corner-pass wavelength of $\lambda_e$, a first corner-stop wavelength of $\lambda_f$, and a first pass-band center wavelength $\lambda_{pb3}$ such that $\lambda_e \leq \lambda_{pb3} \leq \lambda_f$;
transmitting the filtered received second optical signal as a third portion of the received second optical signal;
filtering the third portion of the received second optical signal via a fourth band-pass filter having a fourth corner-pass wavelength of λg, a fourth corner-stop wavelength of $\lambda_h$, and a fourth pass-band center wavelength $\lambda_{pb4}$ such that $\lambda_g \leq \lambda_{pb4} \leq \lambda_h$; and
transmitting the filtered third portion of the received second optical signal as a fourth filtered portion of the received second optical signal,
wherein $\lambda_e < \lambda_g < \lambda_f < \lambda_h$.

12. The method of claim 11, wherein in the second optical signal is the second portion of the received first optical signal.

13. The method of claim 11,
wherein said receiving a first optical signal comprises receiving a first optical signal via a de-multiplexer, and
wherein said receiving a second optical signal comprises receiving a second optical signal via a de-multiplexer.

14. The method of claim 11, further comprising:
wherein said receiving a first optical signal comprises receiving a first optical signal via a multiplexer, and
wherein said receiving a second optical signal comprises receiving a second optical signal via a multiplexer.

15. The method of claim 11,
wherein $|\lambda_b-\lambda_a|=|\lambda_d-\lambda_c|$, and
wherein $|\lambda_f-\lambda_e|=|\lambda_g-\lambda_h|$.

16. A system comprising:
a laser operable to output an optical signal;
a first input optical fiber operable to transmit the optical signal;
a first band-pass filter operable to receive the optical signal from the first input optical fiber and to transmit a first portion of the optical signal;
a second band-pass filter operable to receive the first portion of the optical signal and to transmit a second portion of the optical signal,
a second input optical fiber operable to transmit the optical signal;

a third band-pass filter operable to receive the optical signal from the second input optical fiber and to transmit a third portion of the optical signal; and
a fourth band-pass filter operable to receive the third portion of the optical signal and to transmit a fourth portion of the optical signal,
wherein said first band-pass filter has a first corner-pass wavelength of $\lambda_a$, a first corner-stop wavelength of $\lambda_b$, and a first pass-band center wavelength $\lambda_{pb1}$ such that $\lambda_a \leq \lambda_{pb1} \leq \lambda_b$,
wherein said second band-pass filter has a second corner-pass wavelength of $\lambda_c$, a second corner-stop wavelength of $\lambda_d$, and a second pass-band center wavelength $\lambda_{pb2}$ such that $\lambda_c \leq \lambda_{pb2} \leq \lambda_d$,
wherein $\lambda_a < \lambda_c < \lambda_b < \lambda_d$,
wherein said third band-pass filter has a third corner-pass wavelength of $\lambda_e$, a third corner-stop wavelength of $\lambda_f$, and a third pass-band center wavelength $\lambda_{pb3}$ such that $\lambda_e \leq \lambda_{pb3} \leq \lambda_f$,
wherein said fourth band-pass filter has a fourth corner-pass wavelength of $\lambda_g$, a fourth corner-stop wavelength of $\lambda_h$, and a fourth pass-band center wavelength $\lambda_{pb4}$ such that $\lambda_g \leq \lambda_{pb4} \leq \lambda_h$,
wherein $\lambda_e < \lambda_g < \lambda_f < \lambda_h$,
wherein $$\left|\frac{dA}{d\lambda}\right|_{dB/nm}$$

is the magnitude of each of the filter pass-band slopes of said first, second, third and fourth band-pass filters,
wherein $\lambda_0$ is a central wavelength of said laser,
wherein $CSO_{nat}^{dB\_elec}$ is a native second order distortion value of said laser measured in dBc-electrical units,
wherein $CSO_{tot\_deg}^{dB\_elec}$ is a minimum allowable second order distortion value of a signal after having passed through said first, second, third, and fourth band-pass filters,
wherein $N_{CSO}$ is a number of second order distortion beats that comprise a distortion power at a second order distortion frequency under consideration,
wherein c is the speed of light in a vacuum,
wherein m is an optical modulation index $0 < m \leq 1$
wherein α is a laser chirp of said laser,
wherein y is a laser slope efficiency y of said laser,
wherein I is a bias current of said laser,
wherein $I_{th}$ is a threshold current of said laser,
wherein $P_O$ is an optical output power of said laser, and
wherein the magnitude of each of the filter pass-band slopes of each of said first, second, third, and fourth band-pass filters satisfies at least one of $$\left|\frac{dA}{d\lambda}\right|_{dB/nm} \leq \frac{10}{\ln(10)}\frac{1}{\sqrt{N_{CSO}}}\frac{c}{m\alpha(I-I_{th})}\frac{1}{\lambda_0^2}\left[10^{-\left[\frac{CSO_{tot\_deg}^{dB\_elec}}{20}\right]} - 10^{-\left[\frac{CSO_{nat}^{dB\_elec}}{20}\right]}\right]$$

and $$\left|\frac{dA}{d\lambda}\right|_{dB/nm} \leq \frac{10}{\ln(10)}\frac{1}{\sqrt{N_{CSO}}}\frac{c\gamma}{m\alpha P_O}\frac{1}{\lambda_0^2}\left[10^{-\left[\frac{CSO_{tot\_deg}^{dB\_elec}}{20}\right]} - 10^{-\left[\frac{CSO_{nat}^{dB\_elec}}{20}\right]}\right].$$

* * * * *